United States Patent
Suzuki et al.

(10) Patent No.: US 8,114,550 B2
(45) Date of Patent: Feb. 14, 2012

(54) REINFORCED ELECTROLYTE MEMBRANE FOR FUEL CELL, PRODUCTION METHOD THEREOF, MEMBRANE ELECTRODE ASSEMBLY FOR FUEL CELL, AND SOLID POLYMER FUEL CELL COMPRISING THE SAME

(75) Inventors: Hiroshi Suzuki, Aichi (JP); Yasunori Nouji, Toyota (JP); Kyojiro Inoue, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 423 days.

(21) Appl. No.: 12/376,454

(22) PCT Filed: Aug. 9, 2007

(86) PCT No.: PCT/JP2007/065924
§ 371 (c)(1),
(2), (4) Date: Feb. 5, 2009

(87) PCT Pub. No.: WO2008/018628
PCT Pub. Date: Feb. 14, 2008

(65) Prior Publication Data
US 2010/0196781 A1     Aug. 5, 2010

(30) Foreign Application Priority Data

Aug. 9, 2006  (JP) ................................ 2006-216856

(51) Int. Cl.
*H01M 8/10* (2006.01)
*B05D 5/12* (2006.01)

(52) U.S. Cl. ...................................... 429/483; 427/115

(58) Field of Classification Search .................. 429/483, 429/479, 484, 481, 491, 492, 493, 494; 427/115, 427/535, 551
See application file for complete search history.

(56) References Cited

U.S. PATENT DOCUMENTS

| | | | |
|---|---|---|---|
| 5,082,472 A * | 1/1992 | Mallouk et al. | 95/49 |
| 6,156,451 A * | 12/2000 | Banerjee et al. | 156/228 |
| 2005/0095486 A1 * | 5/2005 | Hamamoto et al. | 429/33 |
| 2007/0087245 A1 * | 4/2007 | Fuller et al. | 429/33 |

FOREIGN PATENT DOCUMENTS

| | | |
|---|---|---|
| JP | 64-22932 | 1/1989 |
| JP | 9-194609 | 7/1997 |
| JP | 2004-143388 | 5/2004 |
| JP | 2004-178995 | 6/2004 |
| JP | 2004-220837 | 8/2004 |
| JP | 2005-38669 | 2/2005 |
| JP | 2005-162776 | 6/2005 |
| JP | 2005-187629 | 7/2005 |
| JP | 2005-353534 | 12/2005 |
| JP | 2007-280653 | 10/2007 |

OTHER PUBLICATIONS

Extended European Search Report for EP Appl. No. 07792558.4 dated Jul. 6, 2010.

* cited by examiner

*Primary Examiner* — Jerry Lorengo
*Assistant Examiner* — Carlos Barcena
(74) *Attorney, Agent, or Firm* — Finnegan, Henderson, Farabow, Garrett & Dunner, LLP

(57) ABSTRACT

A reinforced electrolyte membrane for a fuel cell which is reinforced by a porous membrane, characterized by containing void portions in a joining portion between the surface of the porous membrane and/or pore surface and the electrolyte for buffering swelling when water is contained. This reinforced electrolyte membrane for a fuel cell has improved dimensional stability even if the electrolyte swells.

14 Claims, No Drawings

REINFORCED ELECTROLYTE MEMBRANE FOR FUEL CELL, PRODUCTION METHOD THEREOF, MEMBRANE ELECTRODE ASSEMBLY FOR FUEL CELL, AND SOLID POLYMER FUEL CELL COMPRISING THE SAME

CROSS-REFERENCE TO RELATED APPLICATIONS

This application is a national phase application of International Application No. PCT/JP2007/065924, filed Aug. 9, 2007, and claims the priority of Japanese Application No. 2006-216856, filed Aug. 9, 2006, the contents of both of which are incorporated herein by reference.

TECHNICAL FIELD

The present invention relates to a reinforced electrolyte membrane used in a fuel cell, a production method thereof, a membrane electrode assembly for a fuel cell and a solid polymer fuel cell comprising the same.

Solid polymer electrolyte fuel cells use a solid polymer electrolyte membrane as an electrolyte, and have a structure in which electrodes are joined to either face of this membrane.

When a solid polymer electrolyte membrane is used for a fuel cell, it must itself have a low membrane resistance. To achieve this, the membrane thickness is preferably as thin as possible. However, if the membrane thickness is made too thin, problems arise such as tendencies for pin holes to be formed during membrane production, a membrane to be torn during electrode formation and for short circuits to occur between the electrodes. Further, since the solid polymer electrolyte membrane used in a fuel cell is constantly employed in a moist state, there are problems with reliability, such as swelling of the polymer membrane due to moisture, and pressure resistance and cross leakage during differential pressure operation due to deformation and the like.

In view of this, JP Patent Publication (Kokai) No. 9-194609 A (1997) describes a method for producing an ion exchange membrane by impregnating a polymer dissolved in a solvent into at least the pores of a porous membrane of a fluororesin or the like produced by drawing, adhering the polymer to the porous membrane by drying, then introducing an ion exchange group, for the purpose of providing an ion exchange membrane which is not damaged even if the amount of water in the ion exchange resin repeatedly changes, and in which the ion exchange resin and the porous membrane of a fluororesin or the like are closely adhered to each other so that it is difficult for pin holes to form.

In the method described in JP Patent Publication (Kokai) No. 9-194609 A (1997), the polymer is hydrophilic and the drawn porous membrane is hydrophobic and they are made compatible by the solvent. However, a composite having high durability is not produced, leading to the concern that the electrolyte and the PTFE may separate during use.

On the other hand, JP Patent Publication (Kokai) No. 2005-187629 A describes a composite electrolyte having a fluoropolymer electrolyte bonded to the surface of a porous substrate comprising a fluororesin via a carbonyl imide group or a sulfonyl imide group. In this composite electrolyte solublization in water and marked swelling are sufficiently prevented. Further, the electrolyte is self-standing as a membrane and also has excellent chemical stability.

DISCLOSURE OF THE INVENTION

Examples of means for improving durability in a fuel cell include controlling the exterior dimensional stability when water is contained. However, electrolyte membranes contain water. If they do not contain water, hydrogen protons are not transferred, meaning that the swelling when water is contained is in reality not suppressed.

Accordingly, it has been proposed to improve the durability reliability of the solid polymer electrolyte membrane in the fuel cell. Examples of means for improving durability include controlling the exterior dimensional stability when water is contained. Currently, composite electrolyte membranes have been proposed which combine a PTFE reinforced material in the solid polymer membrane. As a method for improving the dimensional stability of the solid polymer electrolyte membrane, it has been proposed to control dimensional stability by increasing the strength of the PTFE reinforced material.

Melt impregnation is a method of producing a reinforced composite membrane by impregnating a fluoroelectrolyte into the porous membrane. However, melt impregnation has inferior dimensional stability than a casting method in the in-plane direction when water is contained. This is thought to be due to the fact that in melt impregnation the electrolyte is more densely impregnated in the porous membrane than in a casting method, and the fact that the electrolyte resin is more strongly bonded to the porous membrane resin, whereby the electrolyte resin has no room to expand.

In order for fuel cells to become more widely used, a reduction in costs is important. In a casting method, which is a conventional technique for producing a composite reinforced electrolyte membrane by impregnating an electrolyte resin into a porous membrane, production is carried out by coating an electrolyte solution on a PTFE porous membrane formed with many pores by a drawing process, impregnating the electrolyte and then drying. Meanwhile, in melt impregnation, production is carried out by directly impregnating an electrolyte resin precursor melted by heat into a PTFE porous membrane and then carrying out hydrolysis to provide ion exchange groups. In melt impregnation the electrolyte does not have to be dissolved in a solvent, and there is a large selection scope for the electrolyte resin and a high degree of freedom in electrolyte resin design. However, there has been the problem that swelling in the in-plane direction when water is contained is greater than that for an electrolyte membrane produced by a casting method.

This is due to the fact that, compared with a casting method, in melt impregnation the electrolyte resin is more densely packed in the porous membrane and the binding force between the porous membrane resin and the electrolyte resin is larger, meaning that absolutely all of the stress generated when the electrolyte resin swells as a result of water being contained is applied on the porous membrane, and especially, the fact that there is large swelling in the in-plane direction. In contrast, in a casting method, the packing density of the electrolyte resin is also low, and the binding between the porous membrane resin and the electrolyte resin is looser than that for melt impregnation, meaning that as a result of interfacial slippage and the like not all of the stress generated during swelling is applied on the porous membrane. Some of the stress is dissipated in the thickness direction, so that swelling in the in-plane direction can be suppressed.

Accordingly, it is an object of the present invention to provide: (1) a solid polymer electrolyte membrane having a suppressed exterior dimensional change of the whole electrolyte membrane and excellent durability, and a production method thereof, which dimensional change is suppressed as compared with the conventional art for a melt-impregnated membrane for a solid polymer reinforced composite electrolyte membrane, a dimensional change between when it is dried and when water is contained of 15% for MD, 13% for TD and 20% for the membrane thickness direction in terms of swelling ratio; and (2) a solid polymer electrolyte membrane which, especially for a melt impregnation method, has a weakened binding force between the electrolyte and the porous membrane at the porous membrane resin surface and improved dimensional stability even if the electrolyte swells, and a production method thereof.

It is also an object of the present invention to provide a membrane electrode assembly for a fuel cell having excellent dimensional stability and improved durability. It is another object of the present invention to provide a solid polymer fuel cell having high power output and excellent durability by using such a membrane electrode assembly.

The present inventors discovered that the above-described problems are solved by using a reinforced electrolyte membrane having specific voids, thereby arriving at the present invention.

Specifically, first, the present invention is the invention of an electrolyte membrane for a fuel cell which is reinforced by a porous membrane, characterized by comprising void portions in a joining portion between the surface of the porous membrane and/or pore surface and the electrolyte for buffering swelling when water is contained. The void portions absorb the volume increase caused by the swelling of the electrolyte, whereby dimensional stability is excellent and durability is improved.

The reinforced electrolyte membrane for a fuel cell according to the present invention has some effect so long as there are some void portions. However, to exhibit practical dimensional stability and durability, the void portions are preferably 1 to 10% by volume of the total electrolyte membrane, and more preferably 5 to 10% by volume.

For the above-described porous membrane, a wide range of membranes known in the art may be used as a reinforced membrane for a fuel cell. Examples thereof which may be preferably used include a porous substrate comprising a fluororesin, which has excellent strength and shape stability, such as polytetrafluoroethylene, polytetrafluoroethylene-chlorotrifluoroethylene copolymer, polychlorotrifluoroethylene, polybromotrifluoroethylene, polytetrafluoroethylene-bromotrifluoroethylene copolymer, polytetrafluoroethylene-perfluorovinyl ether copolymer and polytetrafluoroethylene-hexafluoropropylene copolymer. The degree of polymerization and molecular weight of such fluororesin is not especially limited, although from the standpoint of strength, shape stability and the like, the fluororesin preferably has a weight average molecular weight of about 10,000 to 10,000,000. Among these, a polytetrafluoroethylene (PTFE) membrane made porous by a drawing process is a preferred example.

Second, the present invention is the invention of a method for producing an electrolyte membrane for a fuel cell which is reinforced by the above described porous membrane, characterized by adding a component which elutes by hydrolysis to an electrolyte membrane in advance, and forming void portions in a joining portion between the surface of the porous membrane and/or pore surface and the electrolyte for buffering swelling when water is contained by making the component elute from the electrolyte membrane during hydrolysis.

Here, while the component which elutes by hydrolysis is not especially limited, a chloride is preferred. Preferred examples of the chloride are sodium chloride or carbonyl chloride.

Another aspect of the method for producing an electrolyte membrane for a fuel cell which is reinforced by the above described porous membrane is characterized by comprising the steps of introducing a functional group which can form an imide group onto the surface of the porous membrane, dipping the porous membrane on which a functional group has been introduced in a melted F-type electrolyte precursor, and providing an ion exchange group by hydrolyzing the F-type electrolyte precursor, whereby void portions are formed in the joining portion between the surface of the porous membrane and/or pore surface and the electrolyte for buffering swelling when water is contained.

Here, in the step of introducing a functional group which can form an imide group onto the surface of the porous membrane, the imide group is preferably represented by the following general formula (1),

—X$_1$—NH—X$_2$—    (1)

wherein X$_1$ and X$_2$ may be the same or different, and each is a carbonyl group (—CO—) or a sulfonyl group (—SO$_2$—).

Specifically, a preferred example of the step of introducing a functional group which can form an imide group onto the surface of the porous membrane generates radicals on the surface of the porous membrane which act as reaction points for introducing carbonyl imide groups or sulfonyl imide groups. Here, preferred examples of the means for forming radicals on the surface of the porous membrane are electron beam irradiation or plasma treatment.

In the method for producing a reinforced electrolyte membrane for a fuel cell according to the present invention, a preferred example of the means for hydrolyzing the F-type electrolyte precursor is a treatment using an alkali and an organic solvent.

In the method for producing a reinforced electrolyte membrane for a fuel cell according to the present invention, the method for joining the electrolyte and the porous membrane is not especially limited. Examples thereof may include melt impregnation and a casting method. Of these, especially, in a melt impregnation method for producing a reinforced composite membrane by melt-impregnating the electrolyte in the porous membrane, the effects of dimensional stability are especially exhibited.

In the method for producing a reinforced electrolyte membrane for a fuel cell according to the present invention, the fact that a polytetrafluoroethylene (PTFE) membrane is preferred as the porous membrane is as described above.

Third, the present invention is the invention of a membrane electrode assembly for a fuel cell (MEA) comprising the above-described reinforced electrolyte membrane for a fuel cell, and comprising a pair of electrodes composed of a fuel electrode supplied with a fuel gas and an oxygen electrode supplied with an oxidizing gas and a polymer electrolyte membrane sandwiched between the pair of electrodes, characterized by the polymer electrolyte membrane being the above-described reinforced electrolyte membrane for a fuel cell.

Fourth, the present invention is the invention of a solid polymer fuel cell comprising a membrane electrode assembly having the above described reinforced electrolyte membrane for a fuel cell.

The electrolyte membrane for a fuel cell according to the present invention, which is reinforced by a porous membrane in which void portions are present in the joining portion between the surface of the porous membrane and/or pore surface and the electrolyte in order to buffer swelling when water is contained, has excellent dimensional stability as a result of these void portions absorbing volume increase caused by swelling of the electrolyte, whereby durability is improved. Further, because it is reinforced by a porous membrane, this electrolyte membrane has excellent mechanical strength. As a result, the durability of the fuel cell can be improved. In addition, by using an electrolyte membrane for a fuel cell which is reinforced by a porous membrane in which void portions are present, a solid polymer fuel cell can be obtained having a high power output and excellent durability.

Specifically, (1) in the conventional art the dimensional change of a melt-impregnated membrane for a solid polymer reinforced composite electrolyte membrane from when dry to when water is contained is 15% for MD, 13% for TD and 20% for the membrane thickness direction in terms of swelling ratio. However, by including voids in the composite reinforced pores, the dimensional change of the electrolyte membrane can be contained within the voids, whereby exterior dimensional change of the whole electrolyte membrane is suppressed, thereby enabling a solid polymer electrolyte membrane having excellent durability to be produced.

Further, (2) melt impregnation, which is a method of producing a reinforced composite membrane by impregnating a polymer electrolyte into a porous membrane, has inferior dimensional stability than a casting method in the in-plane direction when water is contained. This is thought to be due to the fact that in melt impregnation the electrolyte is more densely impregnated in the porous membrane than in a casting method, and the fact that the electrolyte resin is more strongly bonded to the porous membrane resin, whereby the electrolyte resin has no room to expand. Accordingly, in the present invention, the formation of a component on the porous membrane surface by a surface treatment which dissolves during hydrolysis to weaken the binding force between the electrolyte and the porous membrane, and the production of voids into which the electrolyte expands has enabled dimensional stability to be improved.

BEST MODE FOR CARRYING OUT THE INVENTION

The production method and the function of the reinforced electrolyte membrane for a fuel cell according to the present invention will now be described by using two modes as examples.

(1) A reinforced composite electrolyte membrane is usually formed by packing 100% of electrolyte into the pore void portions of a reinforcing layer. However, if the electrolyte in the reinforcing pore voids contains water, the PTFE reinforcement is also unable to withstand the swelling of the electrolyte. As a result, the reinforcing layer also swells, and dimensional stability deteriorates. In the present invention, for example, the reinforced membrane is impregnated with a solution of aqueous 5 to 10% sodium chloride (including alcohol), and dried. Then, the reinforced membrane wherein sodium chloride is deposited on the inside of the reinforced pores is laminated by the electrolyte membrane, which is pressed to produce a reinforced melt-impregnated membrane having excellent dimensional stability containing 5 to 10% of voids.

(2) Radicals are formed on the surface by using an electron beam, plasma or the like on the surface of a PTFE resin in which many pores have been formed by a drawing process, to thereby introduce an imide group or the like thereon. A melted F-type electrolyte precursor is impregnated into the porous membrane which has been subjected to the surface treatment. Since the temperature at this stage is 200 to 300° C., the substance added onto the porous membrane surface must be able to withstand this temperature. After melt impregnation, the composite membrane is hydrolyzed with an alkali and an organic solvent to provide ion exchange groups in the electrolyte precursor. The substance provided on the porous membrane surface at this stage, such as an imide group, elutes from within the membrane, whereby gaps into which the electrolyte can swell form inside the porous membrane. In addition, the bonds between the porous membrane and the polymer electrolyte interface weaken, meaning that stress generated during swelling when water is contained can dissipate in the thickness direction, thereby allowing swelling in the in-plane direction to be suppressed. The substance provided on the porous membrane surface must satisfy the criteria of: (a) adsorbing or binding onto the surface of the PTFE; (b) withstanding temperatures of 200 to 300° C.; and (c) eluting (in an alkali and organic solvent environment) during hydrolysis. In the present invention, a substance which has an imide bond is provided on the porous membrane surface as the substance satisfying these criteria. As a result, in-plane dimensional stability equal to that of an electrolyte membrane produced by a casting method can be obtained even if the reinforced composite electrolyte membrane is produced by a melt impregnation method.

The F-type electrolyte precursor used in the present invention is a polymer electrolyte precursor having a functional group which turns into an ion exchange group by hydrolysis.

The F-type electrolyte precursor preferably is moldable in the temperature range of 200 to 300° C., and has a melt viscosity at that temperature of 4,000 Pa·sec or less at a shear rate of 1/sec. This together with the drawn porous reinforced material having the above-described preferable properties overcomes the problems: (1) that the electrolyte precursor does not impregnate into the drawn porous reinforced material; and (2) that since the pore diameter is large and the reinforcement effects are small, the mechanical durability of the composite membrane cannot be maintained.

Preferred specific examples of the F-type electrolyte precursor include the polymer compounds represented by the following general formula (2) (wherein a:b=1:1 to 9:1, n=0, 1, 2).

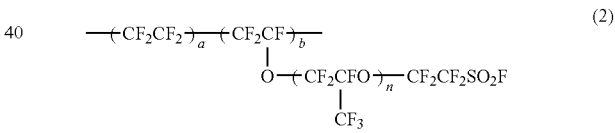

The side chain end sulfonyl fluoride group of the electrolyte precursor represented by the general formula (2) is hydrolyzed by an alkali according to a common procedure, then neutralized with acid to turn into a sulfonic acid group and thereby form the solid polymer electrolyte having an ion exchange ability represented by the following general formula (3) (wherein a:b=1:1 to 9:1, n=0, 1, 2).

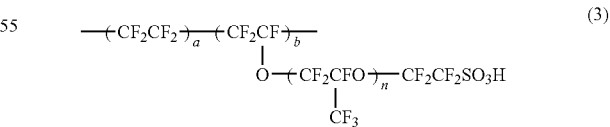

The porous substrate used in the present invention functions as a support which supports a polymer electrolyte on its surface (especially, the surface inside the pores). Examples thereof which may be preferably used include a porous substrate comprising a fluororesin, which has excellent strength and shape stability, such as polytetrafluoroethylene, polytetrafluoroethylene-chlorotrifluoroethylene copolymers, polychlorotrifluoroethylene, polybromotrifluoroethylenes, polytetrafluoroethylene-bromotrifluoroethylene copolymers, polytetrafluoroethylene-perfluorovinyl ether copolymers and polytetrafluoroethylene-hexafluoropropylene copolymers. The degree of polymerization and molecular weight of such fluororesin is not especially limited, although from the standpoint of strength, shape stability and the like, the fluororesin preferably has a weight average molecular weight of about 10,000 to 10,000,000.

Further, while average pore size and porosity of the porous substrate used in the present invention are not especially limited, average pore size is preferably about 0.001 to 100 μm and porosity is preferably about 10 to 99%. If average pore size is less than 0.001 μm, introduction of the polymer electrolyte into the pores tends to be more easily hindered. On the other hand, if average pore size is more than 100 μm, the surface area of the porous substrate supporting the polymer electrolyte is insufficient, whereby electroconductivity tends to decrease. Further, if porosity is less than 10%, the amount of polymer electrolyte supported inside the pores is insufficient, whereby electroconductivity tends to decrease. On the other hand, if porosity is more than 99%, the strength and shape stability of the porous substrate tend to decrease.

Although the shape of the porous substrate used in the present invention is not especially limited, a film shape or a membrane shape is preferred because the obtained composite electrolyte can be used as an electrolyte membrane for a fuel cell as is. In such case, while the thickness of the film shape or membrane shape porous substrate is not especially limited, about 5 to 200 μm is preferred. If the thickness of the porous substrate is less than the above-described lower limit, the strength of the obtained electrolyte membrane tends to decrease, while if it is more than the above-described upper limit, the membrane resistance of the obtained electrolyte membrane increases, whereby electroconductivity tends to decrease.

In the present invention, as the step for introducing an imide group onto the surface (especially, the surface inside the pores) of the porous substrate comprising a fluororesin or the like, methods known in the art such as the below-described (i) to (iv) may be preferably employed.

(1) First, an electron beam is irradiated on the surface of a porous substrate comprising a fluororesin or the like in an oxygen-containing atmosphere to activate the surface. The conditions at that stage are not especially limited, but generally preferred is an oxygen partial pressure of 0.01 to 10 atmospheres, an electron beam irradiation dose of 10 Gy to 1,000 KGy and a temperature of about −50 to 200° C. Next, the surface of the surface-activated porous substrate is oxidized, for example, at 0 to 100° C. using an oxidizing agent such as hydrogen peroxide to obtain a porous substrate having carboxyl groups introduced on the surface. Further, this porous substrate is subjected to halogenation, for example, at 0 to 200° C. using a halogenating agent such as thionyl chloride, phosphorus pentachloride, phosphoryl (V) chloride and sodium fluoride, to thereby obtain a porous substrate comprising a fluororesin having carbonyl chloride groups and/or sulfonyl halide groups introduced therein.

(ii) First, the surface of a porous substrate comprising a fluororesin or the like is subjected to plasma treatment in an oxygen-containing atmosphere to activate the surface. The conditions at that stage are not especially limited, but generally preferred is an oxygen partial pressure of 0.01 to 10 atmospheres, a high-frequency induction method (1 to 100 MHz, 0.1 to 100 KW) and a temperature of about 0 to 200° C. Next, the surface of the surface-activated porous substrate is oxidized, for example, at 0 to 100° C. using an oxidizing agent such as hydrogen peroxide to obtain a porous substrate having carboxyl groups introduced on the surface. Further, this porous substrate is subjected to halogenation, for example, at 0 to 200° C. using a halogenating agent such as thionyl chloride, phosphorus pentachloride, phosphoryl (V) chloride and sodium fluoride, to thereby obtain a porous substrate comprising a fluororesin having carbonyl chloride groups and/or sulfonyl halide groups introduced therein.

(iii) First, a porous substrate comprising a fluororesin or the like is subjected to a surface treatment (hydrophilization) by a metal sodium method. Specifically, a porous substrate comprising a fluororesin is dipped at −50 to 100° C. in a sodium fluororesin surface treating agent (e.g., "Tetra-Etch", manufactured by Junkosha Inc.) containing a metal sodium-ammonia complex salt, a complex compound of metal sodium-naphthalene and tetrahydrofuran and the like, to introduce a hydrophilic group (e.g., a hydroxyl group) on the surface. Next, the surface of the hydrophilized porous substrate is oxidized, for example, at 0 to 100° C. using an oxidizing agent such as hydrogen peroxide to obtain a porous substrate having carboxyl groups introduced on the surface. Further, this porous substrate is subjected to halogenation, for example, at 0 to 200° C. using a halogenating agent such as thionyl chloride, phosphorus pentachloride, phosphoryl (V) chloride and sodium fluoride, to thereby obtain a porous substrate comprising a fluororesin having carbonyl chloride groups and/or sulfonyl halide groups introduced therein.

(iv) First, a porous substrate comprising a fluororesin or the like having a sulfonic acid group introduced on the surface is obtained by a sulfonation treatment. Specifically, sulfur dioxide is reacted at 0 to 200° C. in the presence of zinc or the like, for example, on the surface of a porous substrate comprising a fluororesin or the like having a chlorine group such as polychlorotrifluoroethylene to introduce a sulfonic acid group. Then, the surface is oxidized at 0 to 100° C. using an oxidizing agent such as hydrogen peroxide to obtain a porous substrate having sulfonic acid groups introduced on the surface. Next, this porous substrate is subjected to halogenation, for example, at 0 to 200° C. using a halogenating agent such as thionyl chloride, phosphorus pentachloride, phosphoryl (V) chloride and sodium fluoride, to thereby obtain a porous substrate comprising a fluororesin having carbonyl chloride groups and/or sulfonyl halide groups introduced therein.

By bringing ammonia or an amine compound (lithium bis(trimethylsilyl)amide and the like) into contact with the porous substrate comprising a fluororesin or the like having carbonyl halide groups and/or sulfonyl halide groups introduced therein obtained by the above-described methods of (i) to (iv) to thereby imidize those groups, a porous substrate comprising a fluororesin or the like having carbonyl imide groups and/or sulfonyl imide groups introduced therein is obtained. It is noted that the specific method and conditions during the imidization treatment are not especially limited, and the porous substrate may be brought into direct contact with the ammonia or amine compound, may be brought into contact with the ammonia or amine compound after the compound is dissolved in a suitable solvent (a flon solvent, a 1,4-dioxane solution, tetrahydrofuran (THF), N,N-dimethylformamide (DMF) and the like), or may be exposed to a vapor of the ammonia or amine compound.

The electrolyte in the membrane electrode assembly for a fuel cell according to the present invention may be laminated with a plurality of porous membranes for reinforcement. In such case, among the plurality of porous membranes, at least one of the porous membranes is the reinforced electrolyte membrane of the present invention. The kind of laminated electrolyte membrane is not especially limited so long as the membranes are polymer membranes which can be used as an electrolyte. Further, the laminated electrolyte membranes may all be the same electrolyte membrane, or a mixture of different kinds of electrolyte membrane may be used. Examples which can be used include wholly fluorinated electrolyte membranes such as wholly fluorinated sulfonic acid membranes, wholly fluorinated phosphonic acid membranes, wholly fluorinated carboxylic acid membranes, and a PTFE composite membrane formed by polytetrafluoroethylene (PTFE) and a wholly fluorinated membranes, as well as fluorine-containing hydrocarbon graft membranes, wholly hydrocarbon graft membranes and hydrocarbon electrolyte membranes of wholly aromatic membranes and the like.

The solid polymer fuel cell according to the present invention uses the above-described membrane electrode assembly for fuel cell according to the present invention. Apart from using the membrane electrode assembly for fuel cell according to the present invention, the structure of a commonly known solid polymer fuel cell may be followed. By using the above-described membrane electrode assembly for fuel cell according to the present invention, the solid polymer fuel cell according to the present invention has a large power output, is cheap and has high durability.

EXAMPLES

The examples and comparative examples of the present invention will now be described. Examples 1 and 2 and Comparative example 1 are methods in which a component which elutes by hydrolysis is added to the electrolyte membrane in advance, and void portions in the joining portion between the surface of the porous membrane and/or pore surface and the electrolyte for buffering swelling when water is contained are formed by making the component elute from the electrolyte membrane during hydrolysis. Example 3 and Comparative examples 2 and 3 are methods in which a functional group which can form an imide group is introduced onto the surface of the porous membrane, which is dipped in an F-type electrolyte precursor to provide an ion exchange group by hydrolysis of the F-type electrolyte precursor to thereby form the void portions in the joining portion between the surface of the porous membrane and/or pore surface and the electrolyte.

Example 1

A PTFE porous reinforced membrane was dipped in a solution of aqueous 5 to 10% sodium chloride, removed and then dried for 30 minutes by a drying machine at a temperature of 70° C. to cause sodium chloride to deposit thereto. A Nafion (trade name) electrolyte membrane side chain end F-type membrane was laminated on both the front and back sides of the reinforced membrane on which sodium chloride had deposited, and then pressed by a pressing machine. Electrolyte was impregnated into the sodium-chloride-containing reinforced membrane. The reinforced electrolyte membrane was hydrolyzed with sodium hydroxide:dimethyl sulfoxide (hereinafter, "DMSO"), washed with water, and then the side chain ends were replaced to acid (—$SO_3H$: sulfonic acid group) by hydrochloric acid to produce an electrolyte membrane having voids.

Example 2

Sodium chloride was freeze-dispersed by a ball mill, and 90 to 95 wt. % of a Nafion (trade name) electrolyte pellet having a particle size of 0.1 to 1 μm and 5 to 10 wt. % of dispersed sodium chloride were mixed together. The resultant mixture was extruded and film-molded to produce a 20 μm electrolyte membrane. A sodium chloride electrolyte membrane side chain end F-type membrane was laminated on both the front and back sides of the reinforced membrane, and then pressed by a pressing machine to impregnate sodium chloride electrolyte into the reinforced membrane. The reinforced electrolyte membrane was hydrolyzed with sodium hydroxide:DMSO, washed with water, and then the side chain ends were replaced to acid (—$SO_3H$: sulfonic acid group) by hydrochloric acid to produce an electrolyte membrane having voids.

Comparative Example 1

A Nafion (trade name) side chain end F-type membrane was laminated on both the front and back sides of a PTFE porous reinforced membrane, and then pressed by a pressing machine to impregnate electrolyte thereinto. The reinforced electrolyte membrane was hydrolyzed with sodium hydroxide:DMSO, washed with water, and then the side chain ends were subjected to acid (—$SO_3H$: sulfonic acid group) substitution by hydrochloric acid to produce an electrolyte membrane.

The dimensional change from the dry period to when water is contained and the conductivity in Examples 1 and 2 and Comparative example 1 were measured.

Example 1

Exterior dimensional change: MD 4%, TD 3%
Conductivity: 0.0648 s/cm

Example 2

Exterior dimensional change: MD 3%, TD 3%
Conductivity: 0.0637 s/cm

Comparative Example 1

Exterior dimensional change: MD 15%, TD 15%
Conductivity: 0.0653 s/cm

From these results, it can be seen that the examples according to the present invention bear comparison with conventional electrolyte membranes in terms of conductivity, and have a dimensional change which is remarkably suppressed.

Example 3

1) A drawn porous membrane of PTFE is subjected to plasma treatment, whereby radicals are formed on the porous membrane surface (including the surface inside the pores). Next, the porous membrane is dipped in 10% hydrogen peroxide water, which is boiled for 1 hour to obtain a porous membrane having carboxyl groups introduced on the surface.

2) Further, this porous membrane is subjected to halogenation for 10 hours at 90° C. by dipping in a mixed solution of phosphorus pentachloride and phosphoryl (V) chloride ($PCl_5$/$POCl_3$=3/7 (weight/weight), to thereby turn carboxyl groups on all the surfaces into chlorides.

3) Next, the porous membrane having carbonyl chloride groups introduced on its surface is dipped in 4,4-diaminodiphenylethyl/N-methyl-2-pyrrolidone solution. By a reaction at 60° C. for 48 hours, carbonyl imide groups were introduced onto the porous membrane surface to obtain a surface treated porous membrane.

4) A polymer electrolyte precursor polymer ("NE111F", a polymer manufactured by Dupont, whose polymer chain ends are —SO₂F) is extruded using an extruder to obtain a thin membrane having a thickness of about 0.015 mm.

5) The polymer electrolyte thin membrane was laminated on both faces of the surface treated porous membrane, and the resultant product was subjected to an impregnation treatment at a pressure of 5 kg/cm² under a 230° C. vacuum environment to obtain a transparent membrane.

6) The obtained composite membrane was hydrolyzed for 3 hours at 80° C. with 1 N NaOH/DMSO solution, washed with water and then dipped for 1 hour at 80° C. in 1 N $H_2SO_4$ solution to introduce ion exchange groups into the electrolyte resin, whereby an electrolyte membrane was obtained.

Comparative Example 2

Hot Pressing

1) A thin membrane of the same electrolyte resin precursor polymer as that produced in Example 3 was laminated on a drawn porous membrane of PTFE which had not been subjected to surface treatment, and the resultant product was subjected to an impregnation treatment at a pressure of 5 kg/cm² under a 230° C. vacuum environment to obtain a transparent membrane.

2) The obtained composite membrane was hydrolyzed for 3 hours at 80° C. with 1 N NaOH/DMSO solution, washed with water and then dipped for 1 hour at 80° C. in 1 N $H_2SO_4$ solution to introduce ion exchange groups into the electrolyte resin, whereby an electrolyte membrane was obtained.

Comparative Example 3

No Hot Pressing

1) A solution of an electrolyte resin ("Polymer solution DE2020", manufactured by Dupont, whose polymer chain ends are —SO₂F) was poured onto a drawn porous membrane of PTFE which had not been subjected to surface treatment, and this was dried for 1 hour at 70° C. to obtain an electrolyte membrane.

For Example 3 and Comparative examples 2 and 3, water was incorporated into the obtained membranes by dipping in pure water for 3 hours at 90° C., and the dimensional change at that time was measured.

Example 3

Surface direction dimensional change: 6%, Thickness direction dimensional change: 34%

Comparative example 2

Surface direction dimensional change: 18%, Thickness direction dimensional change: 12%

Comparative example 3

Surface direction dimensional change: 5%, Thickness direction dimensional change: 32%

From these results, it was confirmed that according to the present invention dimensional stability comparable to that of a cast membrane can be obtained from an electrolyte membrane by melt impregnation.

INDUSTRIAL APPLICABILITY

The electrolyte membrane for a fuel cell according to the present invention not only has excellent mechanical strength, but also has excellent dimensional stability and improved durability as a result of void portions present in the joining portion between the surface of the porous membrane and/or pore surface and the electrolyte absorbing volume increase caused by swelling of the electrolyte, thereby enabling the fuel cell to have improved durability. This will contribute to the realization and spread of fuel cells.

The invention claimed is:

1. A reinforced electrolyte membrane for a fuel cell which is reinforced by a porous membrane, comprising:
    void portions in a joining portion between the surface of the porous membrane and/or pore surface and the electrolyte for buffering swelling when water is contained, the void portions being obtained by
    a first process including adding a component which elutes by hydrolysis to an electrolyte membrane in advance, and making the component elute from the electrolyte membrane during hydrolysis; or
    a second process including introducing a functional group which can form an imide group onto the surface of the porous membrane, dipping the porous membrane on which the functional group has been introduced in a melted F-type electrolyte precursor, and providing an ion exchange group by hydrolyzing the F-type electrolyte precursor and wherein the void portions are 1 to 10% by volume of the total electrolyte membrane.

2. The reinforced electrolyte membrane for a fuel cell according to claim 1, wherein the porous membrane is a polytetrafluoroethylene membrane made porous by a drawing process.

3. A membrane electrode assembly for a fuel cell comprising a pair of electrodes comprising a fuel electrode supplied with a fuel gas and an oxygen electrode supplied with an oxidizing gas and a polymer electrolyte membrane sandwiched between the pair of electrodes, wherein the polymer electrolyte membrane is the reinforced electrolyte membrane for a fuel cell according to claim 1.

4. A solid polymer fuel cell comprising a membrane electrode assembly having the reinforced electrolyte membrane for a fuel cell according to claim 1.

5. A method for producing a reinforced electrolyte membrane for a fuel cell which is reinforced by a porous membrane, comprising adding a component which elutes by hydrolysis to an electrolyte membrane in advance, and forming void portions in a joining portion between the surface of the porous membrane and/or pore surface and the electrolyte for buffering swelling when water is contained by making the component elute from the electrolyte membrane during hydrolysis and wherein the void portions are 1 to 10% by volume of the total electrolyte membrane.

6. The method for producing a reinforced electrolyte membrane for a fuel cell according to claim 5, wherein the component which elutes by hydrolysis is a chloride.

7. The method for producing a reinforced electrolyte membrane for a fuel cell according to claim 6, wherein the chloride is sodium chloride or carbonyl chloride.

8. The method for producing a reinforced electrolyte membrane for a fuel cell according to claim 5, comprising producing a reinforced composite membrane by melt-impregnating the electrolyte in the porous membrane.

9. The method for producing a reinforced electrolyte membrane for a fuel cell according to claim 5, wherein the porous membrane is a polytetrafluoroethylene membrane.

10. A method for producing a reinforced electrolyte membrane for a fuel cell which is reinforced by a porous membrane, comprising the steps of introducing a functional group which can form an imide group onto the surface of the porous membrane, dipping the porous membrane on which a functional group has been introduced in a melted F-type electrolyte precursor, and providing an ion exchange group by hydrolyzing the F-type electrolyte precursor, whereby void portions are formed in the joining portion between the surface of the porous membrane and/or pore surface and the electrolyte for buffering swelling when water is contained and wherein the void portions are 1 to 10% by volume of the total electrolyte membrane.

11. The method for producing a reinforced electrolyte membrane for a fuel cell according to claim 10, wherein the imide group is represented by the following general formula (1), $$—X_1—NH—X_2— \quad (1)$$

wherein $X_1$ and $X_2$ may be the same or different, and each is a carbonyl group (—CO—) or a sulfonyl group (—SO$_2$—).

12. The method for producing a reinforced electrolyte membrane for a fuel cell according to claim 11, wherein the step of introducing a functional group which can form an imide group onto the surface of the porous membrane is a step of generating radicals on the surface of the porous membrane which act as reaction points for introducing carbonyl imide groups or sulfonyl imide groups.

13. The method for producing a reinforced electrolyte membrane for a fuel cell according to claim 12, wherein means for generating radicals on the surface of the porous membrane is electron beam irradiation or plasma treatment.

14. The method for producing a reinforced electrolyte membrane for a fuel cell according to claim 10, wherein the means for hydrolyzing the F-type electrolyte precursor is a treatment using an alkali and an organic solvent.

* * * * *